United States Patent [19]

Itoh et al.

[11] Patent Number: 4,882,403

[45] Date of Patent: * Nov. 21, 1989

[54] NON-HYDROUS SOFT CONTACT LENS AND PROCESS FOR PRODUCING THE SAME

[75] Inventors: Tetsuo Itoh, Machida; Noboru Satoh; Kazuhiko Takahashi, both of Yokohama; Taro Suminoe, Tokyo; Takao Shimizu, Toda, all of Japan

[73] Assignees: Japan Synthetic Rubber Co., Ltd.; Ricky Contact Lens, Inc., Tokyo, Japan

[*] Notice: The portion of the term of this patent subsequent to Apr. 12, 2005 has been disclaimed.

[21] Appl. No.: 199,957

[22] Filed: May 27, 1988

[30] Foreign Application Priority Data

May 29, 1987 [JP] Japan .................. 62-134115

[51] Int. Cl.$^4$ ............................................. C08F 18/20
[52] U.S. Cl. ............................................................ 526/245
[58] Field of Search .......................................... 526/245

[56] References Cited

U.S. PATENT DOCUMENTS

| | | | |
|---|---|---|---|
| 3,808,179 | 4/1974 | Gaylord | 526/230.5 |
| 3,850,892 | 11/1974 | Shen et al. | 526/320 |
| 3,950,315 | 4/1976 | Cleaver | 526/245 |
| 4,737,556 | 4/1988 | Itoh et al. | 526/245 |

Primary Examiner—Joseph L. Schofer
Assistant Examiner—N. Sarofim
Attorney, Agent, or Firm—Oblon, Spivak, McClelland, Maier & Neustadt

[57] ABSTRACT

A non-hydrous soft contact lens comprising a copolymer comprising, as monomer units:
(a) from 33.9 to 89 mol % of an acrylate represented by the general formula (I) shown below;
(b) from 4.9 to 65 mol % of a methacrylate represented by the general formula (II) shown below;
(c) from 1 to 20 mol % of at least one selected from an unsaturated carboxylic acid and its particular esters;
(d) from 0 to 20 mol % of a particular acrylic acid ester having a straight chain alkyl or fluoroalkyl group;
(e) from 0 to 20 mol % of a methacrylic acid ester having a straight-chain alkyl group;
(f) from 0.1 to 10 mol % of a crosslinking monomer.

General formula (I):

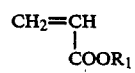

wherein $R_1$ is a particular straight-chain alkyl or fluoroalkyl group.

General formula (II):

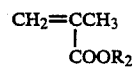

wherein $R_2$ is a particular straight-chain fluoroalkyl group; and a process for preparing the same. This contact lens has good oxygen permeability, mechanical strength, etc.

16 Claims, No Drawings

NON-HYDROUS SOFT CONTACT LENS AND PROCESS FOR PRODUCING THE SAME

BACKGROUND OF THE INVENTION

1. Field of the Invention

This invention relates to a soft contact lens and a process for producing the same, and, more particularly, to a non-hydrous soft contact lens having high oxygen permeability and good mechanical strength, etc., and a process for producing the same.

2. Description of Prior Art

As soft contact lenses, there are known hydrous soft contact lenses made of hydrous polymers such as poly-2-hydroxyethyl methacrylate, and non-hydrous soft contact lenses made of silicone polymers or the like. The hydrous soft contact lenses, in general, have such an insufficient oxygen permeability that they are apt to damage the metabolism of corneal tissues, or require frequent sterilization by boiling to prevent the propagation of bacteria and the like, thereby being cumbersome. In contrast with this, the non-hydrous soft contact lenses made of silicone polymers have good oxygen permeability, but are accompanied with the problem that they tend to be contaminated by lachrymal components to cause a blur of contact lens after continuous wear for a long period of time, which blue can not be removed by cleaners.

Also, it is desirable for soft contact lenses to have good affinity for eyes without any feeling of foreign matters. Japanese Patent Publication (KOKOKU) No. 33887/1984 discloses a process for producing a non-hydrous soft contact lens having good affinity for an eye, comprising subjecting a lens substrate mainly comprising a polyacrylate or polymethacrylate and having the shape of a contact lens to esterification treatment and/or transesterification treatment. This contact lens, however, is disadvantageous in that it has insufficient oxygen permeability and therefore can not be worn for a long time, and also has a low mechanical strength.

Now, it has been sought after to develop a soft contact lens that may require no sterilization by boiling and causes no metabolism disorder in the corneal textures even after wearing for a long time, in other words, a soft contact lens of non-hydrous type, having resistance to the stain by lachrymal components and having good oxygen permeability.

As such a contact lens, for example, U.S. Pat. No. 3,808,179 discloses a contact lens comprising a copolymer of a fluoroalkylester of acrylic acid or methacrylic acid with an alkyl ester of acrylic acid or methacrylic acid. Japanese Patent Publication (KOKOKU) No. 46614/1976 also discloses a soft contact lens comprising a copolymer of methyl methacrylate with a fluoroalkyl methacrylate.

The soft contact lens described in the U.S. Pat. No. 3,808,179, however, involves problems that it has a low mechanical strength and tends to be broken when handled, and the soft contact lens described in Japanese Patent Publication (KOKOKU) No. 46614/1976 also involves the problem that it has a low oxygen permeability because of the employment of methyl methacrylate.

The present inventors disclosed in U.S. Pat. No. 4,737,556 a non-hydrous soft contact lens capable of solving the problems mentioned above, which comprises a copolymer comprising, as monomer units, 49.9 to 95 mole % of an acrylate represented by Formula (I) shown below, 0 to 10 mole % of at least one selected from the group consisting of acrylic acid, an acrylic acid alkyl ester or acrylic acid fluoroalkyl ester whose alkyl group or fluoroalkyl group has 1 to 3 carbon atoms, 4.9 to 50 mole % of a methacrylate represented by Formula (II) shown below, and 0.1 to 10 mole % of a crosslinking monomer, and processes for preparing it.

(I)

wherein $R^1$ is at least one selected from the group consisting of a straight chain fluoroalkyl group represented by the formula: $-(CH_2)_l-C_mF_nH_p$, where l is an integer of 1 or 2, m is an integer of 3 to 8, n is an integer of 6 or more, p is an integer of 0 or more, and m, n and p satisfy the equation: $n+p=2m+1$; and a straight chain alkyl group represented by the formula: $-C_qH_{2q+1}$, where q is an integer of 4 to 10.

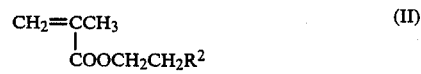
(II)

wherein $R^2$ is a straight chain fluoroalkyl group represented by the formula: $-C_xF_yH_z$, where x is an integer of 0 or more, and x, y and z satisfy the equation: $y+z=2x+1$.

SUMMARY OF THE INVENTION

An object of this invention is to provide another non-hydrous soft contact lens free from the problems mentioned above by developing the disclosure in said U.S. Pat. No. 4,737,556, that is, to provide a non-hydrous soft contact lens requiring no sterilization by boiling, having resistance to stain by lachrymal components, having very good oxygen permeability and mechanical strength, having good elastic recovery, and being free from the deformation due to internal stress induced during the polymerization.

As a result of intensive studies, the present inventors have found that employment of a copolymer obtained by using a monomer mixture of a specific composition can achieve the above object.

Thus, this invention provides a non-hydrous soft contact lens comprising a copolymer comprising, as monomer units,:

(a) from 33.9 to 89 mol % of an acrylate represented by the general formula (I) shown below;

(b) from 4.9 to 65 mol % of a methacrylate represented by the general formula (II) shown below;

(c) from 1 to 20 mol % of at least one monomer selected from the group consisting of an unsaturated carboxylic acid, an unsaturated carboxylic acid anhydride, an unsaturated carboxylic acid alkyl ester having a branched or cyclic alkyl group which may have a substituent, and an unsaturated carboxylic acid fluoroalkyl ester having a branched or cyclic fluoroalkyl group which may have a substituent;

(d) from 0 to 20 mol % of at least one monomer selected from the group consisting of an acrylic acid lower alkyl ester having a straight-chain alkyl group containing 1 to 3 carbon atoms, and an acrylic acid lower fluoroalkyl ester having a straight-chain fluoroalkyl group containing 1 to 3 carbon atoms;

(e) from 0 to 20 mol % of a methacrylic acid alkyl ester having a straight-chain alkyl group containing 4 to 10 carbon atoms; and (f) from 0.1 to 10 mol % of a crosslinking monomer.

General formula (I):

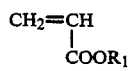

wherein $R_1$ is at least one selected from the group consisting of a straight-chain fluoroalkyl group represented by the formula: $(CH_2)_l\!-\!C_mF_nH_p$, where l is an integer of 1 or 2, m is an integer of 3 to 8, n is an integer of 6 or more, p is an integer of 0 or more, and m, n and p having the relation of $n+p=2m+1$; and a straight-chain alkyl group represented by the formula: $C_qH_{2q+1}$, where q is an integer of 4 to 10.

General formula (II):

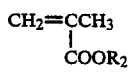

wherein $R_2$ is a straight-chain fluoroalkyl group represented by the formula: $(CH_2)_w\!-\!C_xF_yH_z$, where w is an integer of 1 or 2, x is an integer of 1 to 10, y is an integer of 3 or more, z is an integer of 0 or more, and x, y and z have the relation of $y+z=2x+1$.

As compared with the conventional hydrous soft contact lenses or non-hydrous soft contact lenses, the soft contact lens of this invention may not cause any changes in the soft contact lens, such as a blur owing to stain absorption, even after wear for a long period of time, and shows so high an oxygen permeability that could never have been expected from hard contact lenses formed from polymers comprising other acrylic acid fluoroalkyl esters or methacrylic acid fluoroalkyl esters. Accordingly, it has the advantages that no metabolism disorder may occur in corneal tissues even after wear for a long period of time, it can be used with good wear feeling, no sterilization by boiling is not required because of the non-hydrous type, no deformation may be caused by the internal stress produced in the copolymer when polymerized, and moreover it has excellent mechanical strength and has good elastic recovery.

DETAILED DESCRIPTION OF THE INVENTION

This invention will be described below in detail.

One of the components constituting the soft contact lens of this invention (hereinafter referred to as "Component (a)") is an acrylate represented by the general formula (I) shown above. In the general formula (I), $R_1$ is a straight-chain fluoroalkyl group having 4 to 10 carbon atoms or a straight-chain alkyl group having 4 to 10 carbon atoms. If the number of carbon atoms in the fluoroalkyl group or alkyl group represented by $R_1$ is 3 or less, the resulting soft contact lens may have an overly high rigidity and no product having the high oxygen permeability characteristic of this invention can be obtained. Meanwhile, the soft contact lens according to this invention can be produced, as will be described later, by (1) a process comprising carrying out polymerization directly in a mold and (2) a process comprising cutting and polishing a bulk rigid copolymer into the shape of a contact lens, followed by softening by esterification treatment and/or transesterification treatment. Now, if the number of carbon atoms in the fluoroalkyl group or the alkyl group represented by $R_1$ is 11 or more, a large internal stress may be induced in the copolymer in the course of the polymerization, resulting in deformation of the soft contact lens due to release of internal stress after it has been released from a mold after polymerization in the case of the process (1) or after it has been softened by esterification treatment and/or transesterification treatment in the case of the process (2).

Examples of the above Component (a) may include, acrylic acid fluoroalkyl esters such as 2,2,3,4,4,4-hexafluorobutyl acrylate, 2,2,3,3,4,4,4-heptafluorobutyl acrylate, 2,2,3,3,4,4,5,5-octafluoropentyl acrylate, 2,2,3,3,4,4,5,5,5-nonafluoropentyl acrylate, 2,2,3,3,4,4,5,5,6,6,7,7-dodecafluoroheptyl acrylate, 2,2,3,3,4,4,5,5,6,6,7,7,7-tridecafluoroheptyl acrylate, 3,3,4,4,5,5,6,6,7,7,8,8-dodecafluorooctyl acrylate, 3,3,4,4,5,5,6,6,7,7,8,8-tridecafluorooctyl acrylate, 3,3,4,4,5,5,6,6,7,7,8,8,9,9,10,10-hexadecafluorodecyl acrylate, and 3,3,4,4,5,5,6,6,7,7,8,8,9,9,10,10,10-heptadecafluorodecyl acrylate; and acrylic acid alkyl esters such as n-butyl acrylate, n-pentyl acrylate, n-hexyl acrylate, n-heptyl acrylate, n-octyl acrylate, n-nonyl acrylate, and n-decyl acrylate. These may be used alone or by mixing two or more. Of the above acrylic acid fluoroalkyl esters and acrylic acid alkyl esters, particularly preferable ones include 2,2,3,3,4,4,4-heptafluorobutyl acrylate, 2,2,3,4,4,4-hexafluorobutyl acrylate, 3,3,4,4,5,5,6,6,7,7,8,8-tridecafluorooctyl acrylate, 3,3,4,4,5,5,6,6,7,7,8,8,9,9,10,10-heptadecafluorodecyl acrylate, n-butyl acrylate, n-hexyl acrylate, and n-octyl acrylate.

The above Component (a) is held in the soft contact lens of this invention in a proportion of from 33.9 to 89 mol %, preferably from 35 to 80 mol %. The proportion of Component (a) otherwise less than 33.9 mol % may result in increase in the rigidness of the soft contact lens to show delayed elastic recovery, and on the other hand the proportion otherwise more than 89 mol % may bring about a lowering of the mechanical strength of the soft contact lens.

Another component for constituting the soft contact lens of this invention is a methacrylate represented by the general formula (II) shown above (hereinafter referred to as "Component (b)"). In the general formula (II), $R_2$ is a straight-chain fluoroalkyl group having 2 to 12 carbon atoms. A fluorine-unsubstituted alkyl group having 1 carbon atom may result in a lowering of the oxygen permeability of the resulting soft contact lens. If the number of carbon atoms is 13 or more, an internal stress is liable to be produced in the copolymer in the course of polymerization.

Examples of the above Component (b) may include 2,2,2-trifluoroethyl methacrylate, 2,2,3,3-tetrafluoropropyl methacrylate, 2,2,3,3,3-pentafluoropropyl methacrylate, 2,2,3,4,4,4-hexafluorobutyl methacrylate, 2,2,3,3,4,4,4-heptafluorobutyl methacrylate, 2,2,3,3,4,4,5,5-octafluoropentyl methacrylate, 2,2,3,3,4,4,5,5,5-nonafluoropentyl methacrylate, 2,2,3,3,4,4,5,5,6,6,7,7-dodecafluoroheptyl methacrylate, 2,2,3,3,4,4,5,5,6,6,7,7,7-tridecafluoroheptyl methacrylate, 3,3,4,4,5,5,6,6,7,7,8,8-dodecafluorooctyl methacrylate, 3,3,4,4,5,5,6,6,7,7,8,8-tridecafluorooctyl methacrylate, 3,3,4,4,5,5,6,6,7,7,8,8,9,9,10,10-hexadecafluorodecyl methacrylate and 3,3,4,4,5,5,6,6,7,7,8,8,9,9,10,10,10-heptadecafluorodecyl methacrylate. Particularly preferred ones include 2,2,3,4,4,4-hexafluorobutyl methacrylate, 2,2,3,3,4,4,4-heptafluorobutyl methacrylate, 3,3,4,4,5,5,6,6,7,7,8,8-dodecafluorooctyl methacrylate, 3,3,4,4,5,5,6,6,7,7,8,8-tridecafluorooctyl methacrylate and 3,3,4,4,5,5,6,6,7,7,8,8,9,9,10,10,10-heptadecafluorodecyl methacrylate. These can be used alone or by mixing two or more.

The above Component (b) is held in the soft contact lens of this invention in the proportion of from 4.9 to 65 mol %, preferably from 19 to 40 mol %. The proportion of Component (b) otherwise less than 4.9 mol % may result in a lowering of the oxygen permeability of the soft contact lens, and on the other hand the proportion otherwise more than 65 mol % may result in increase in the rigidity of the soft contact lens to show delayed elastic recovery.

The soft contact lens of this invention contains as still another component for constituting it from 1 to 20 mol % of at least one monomer selected from an unsaturated carboxylic acid, an unsaturated carboxylic acid anhydride, an unsaturated carboxylic acid alkyl ester having a branched or cyclic alkyl group, and an unsaturated carboxylic acid fluoroalkyl ester having a branched or cyclic fluoroalkyl group (hereinafter referred to as "Component (c)"). Component (c) has a function to improve the mechanical strength of the soft contact lens, and can exhibit a remarkable effect with use in a small amount.

Examples of the above unsaturated carboxylic acid and unsaturated carboxylic acid anhydride may include unsaturated mono- or dicarboxylic acids such as acrylic acid, methacrylic acid, itaconic acid and the anhydrides thereof. As the unsaturated carboxylic acid, preferred are acrylic acid, methacrylic acid and itaconic acid, and particularly preferred are acrylic acid and methacrylic acid.

The above unsaturated carboxylic acid alkyl ester having a branched or cyclic alkyl group which may have a substituent such as a phenyl group, may preferably include those having a branched or cyclic alkyl group containing 4 to 10 carbon atoms, and specific examples thereof may include t-butyl acrylate or methacrylate, cyclohexyl acrylate or methacrylate, phenoxy acrylate or methacrylate, benzyl acrylate or methacrylate, and tetrahydrofurfuryl acrylate or methacrylate. Particularly preferred are cyclohexyl methacrylate, benzyl methacrylate and the like.

The above unsaturated carboxylic acid fluoroalkyl ester having a branched or cyclic fluoroalkyl group which may be substituted by a hydroxyl group, may preferably include those having a branched or cyclic fluoroalkyl group containing 3 to 10 carbon atoms which may be substituted by a hydroxyl group, and specific examples thereof may include 2,2,2-trifluoro-1-trifluoromethylethyl acrylate or methacrylate, 2,2,3,3-tetrafluoro-t-amy acrylate or methacrylate, 2,2,3,4,4,4-hexafluoro-t-hexyl acrylate or methacrylate, 2,3,4,5,5,5-hexafluoro-2,4-bis(trifluoromethyl)pentyl acrylate or methacrylate, 2-hydroxy-4,4,5,5,6,7,7,7-octafluoro-6-trifluoromethylheptyl acrylate or methacrylate, and 2-hydroxy-4,4,5,5,6,6,7,7,8,9,9,9-dodecafluoro-8-trifluoromethylnonyl acrylate or methacrylate. Particularly preferred are 2,2,2-trifluoro-1-trifluoromethylethyl methacrylate, 2,2,3,4,4,4-hexafluoro-t-hexyl methacrylate and the like. The above Component (c) can be used alone or by mixing two or more.

The above Component (c) is held in the soft contact lens of this invention in the proportion of from 1 to 20 mol %, preferably from 3 to 15 mol %. The proportion of Component (c) otherwise less than 1 mol % may result in a lowering of the mechanical strength of the soft contact lens, and on the other hand the proportion otherwise more than 20 mol % may result in increase in the rigidity of the soft contact lens to show delayed elastic recovery.

The above Component (c), preferably, comprises methacrylic acid or comprises both acrylic acid and at least one selected from the group consisting of the methacrylic acid alkyl ester having a branched or cyclic alkyl group which may have a substituent and the methacrylic acid fluoroalkyl ester having a branched or cyclic fluoroalkyl group which may have a substituent. Where Component (c) comprises methacrylic acid, it more preferably further comprises acrylic acid together. Where Component (c) comprises methacrylic acid, the content of methacrylic acid in the soft contact lens is preferably from 2 to 10 mol %, and where Component (c) comprises acrylic acid, the content of acrylic acid in the soft contact lens is preferably from 2 to 10 mol %. Where Component (c) comprises both mehtacrylic acid and acrylic acid, the total content thereof is preferably from 2 to 10 mol %.

Still another component for constituting the soft contact lens of this invention is at least one monomer selected from the group consisting of an acrylic acid lower alkyl ester having a straight-chain alkyl group containing 1 to 3 carbon atoms, and an acrylic acid lower fluoroalkyl ester having a straight-chain fluoroalkyl group containing 1 to 3 carbon atoms (hereinafter referred to as "Component (d)").

Specific examples of the above acrylic acid lower alkyl ester having a straight-chain alkyl group containing 1 to 3 carbon atoms may include methyl acrylate, ethyl acrylate and n-propyl acrylate, and specific examples of the above acrylic acid lower fluoroalkyl ester having a straight-chain fluoroalkyl group containing 1 to 3 carbon atoms may include 2,2,2-trifluoroethyl acrylate, 2,2,3,3-tetrafluoropropyl acrylate, and 2,2,3,3,3-pentafluoropropyl acrylate. These of Component (d) can be used alone or by mixing two or more.

The above Component (d) is held in the soft contact lens of this invention in the proportion of from 0 to 20 mol %, preferably from 0 to 10 mol %. The proportion of Component (b) otherwise more than 20 mol % may result in a lowering of the oxygen permeability of the soft contact lens and a tendency that its flexibility is lost.

Still another component for constituting the soft contact lens of this invention is a methacrylic acid alkyl ester having a straight-chain alkyl group containing 4 to 10 carbon atoms (hereinafter referred to as "Component (e)").

Specific examples of the above Component (e) may include n-butyl methacrylate, n-pentyl methacrylate, n-hexyl methacrylate, n-heptyl methacrylate, n-octyl methacrylate, n-nonyl methacrylate, and n-decyl methacrylate. Particularly preferred are n-butyl methacrylate, n-pentyl methacrylate, and n-hexyl methacrylate. These may be used alone or in combination.

The above Component (e) is held in the soft contact lens of this invention in the proportion of from 0 to 20 mol %, preferably from 0 to 10 mol %. The proportion of Component (e) otherwise more than 20 mol % tends to lower the oxygen permeability of the resulting soft contact lens.

Still another component for constituting the soft contact lens of this invention is a crosslinking monomer (hereinafter referred to as "Component (f)"). This Component (f) may include, for example, divinyl esters of organic dicarboxylic acids such as oxalic acid, terephthalic acid, hexahydrophthalic acid, malonic acid and succinic acid; divinyl hydrocarbons such as divinyl benzene, divinyl toluene, and 1,4-pentadiene and 1,5-hexadiene (i.e., α, ω-diolefinic hydrocarbons); diacrylic or dimethacrylic acid esters of a diol compound such as 1,3-propanediol, 1,2-propanediol, 1,4-butanediol, 1,6-hexanediol, ethylene glycol, diethylene glycol and the like; 2-(2-hydroxy-1,1-dimethylethyl)-5-hydroxymethyl-5-ethyl-1,3-dioxane diacrylate or dimethacrylate, tricyclodecanedimethylol diacrylate or dimethacrylate; addition products of ε-caprolactone with tricyclodecanedimethylol diacrylate or dimethacrylate; reaction products of acrylic or methacrylic acid with trimethylol propane and phthalic anhydride; reaction products of acrylic or methacrylic acid with propylene oxide and phthalic anhydride; reaction products of acrylic or methacrylic acid with 1,4-butanediol or 1,6-hexanediol and phthalic acid; reaction products of acrylic or methacrylic acid with propylene glycol, ethylene glycol, diethylene glycol or triethylene glycol and phthalic anhydride; and crosslinking monomers having cyclic structure such as 2,2-bis(4-acryloxypolyethoxyphenyl)propane, 2,2-bis(4-methacryloxypolyethoxyphenyl)propane, diglycidyl terephthalate and spiroglycol diglycidyl ether. These may be used alone or by mixing two or more.

Among the above Component (f), particularly preferred ones may include dimethacrylates of the diol compound such as ethylene glycol, diethylene glycol, 1,3-butanediol, 1,4-butanediol and 1,6-hexanediol.

The above Component (f) is held in the soft contact lens of this invention in the proportion of from 0.1 to 10 mol %, preferably from 1 to 5 mol %. The proportion of Component (f) otherwise less than 0.1 mol % makes poor the shape stability, and on the other hand the proportion more than 10 mol % makes brittle the soft contact lens.

The fluorine content in the soft contact lens of this invention may preferably range from 5 to 50% by weight, particularly preferably from 10 to 45% by weight. The fluorine content otherwise less than 5% by weight may result in an insufficient oxygen permeability of the soft contact lens, and on the other hand the content otherwise more than 50% by weight may bring about the problem that the soft contact lens sometimes show the delayed elastic recovery.

The soft contact lens of this invention can be produced by, for example, (1) a process comprising polymerizing the monomer mixture comprised of the above components (a) to (f) directly in a mold having the shape of a contact lens, or (2) a process comprising polymerizing a monomer mixture comprising Components (i) to (iv) described below to obtain a bulk rigid copolymer, and thereafter cutting and polishing the resulting rigid copolymer into the shape of a contact lens, followed by bringing it into contact with an alcohol. The above process (1) involves economical, operational or the like problems as it requires to prepare a large number of precise molds according to the shapes of contact lenses, thus, in general, preferred is to use the above process (2). Now, description will be made below as to the process for preparing the soft contact lens according to the above process (2).

In the above process (2), an intended soft contact lens is produced by bringing a lens substrate formed in the shape of a content lens which comprises a rigid copolymer obtained by polymerizing a monomer mixture comprising:

(i) from 33.9 to 95 mol %, preferably from 40 to 85 mol %, of at least one monomer selected from the group consisting of an unsaturated carboxylic acid, an unsaturated carboxylic acid anhydride, an unsaturated carboxylic acid alkyl ester having a branched or cyclic alkyl group which may have a substituent, and an unsaturated carboxylic acid fluoroalkyl ester having a branched or cyclic fluoroalkyl group which may have a substituent such as hydroxyl group (hereinafter referred to as "Component (i)");

(ii) from 0 to 46 mol % of at least one monomer selected from the group consisting of an acrylic acid lower alkyl ester having a straight-chain alkyl group containing 1 to 3 carbon atoms, an acrylic acid lower fluoroalkyl ester having a straight-chain fluoroalkyl group containing 1 to 3 carbon atoms, and an acrylate represented by the general formula (I) set out above (hereinafter referred to as "Component (ii)");

(iii) from 4.9 to 65 mol % of a methacrylate represented by the general formula (II) set out above (hereinafter referred to as "Component (iii)"); and (iv) from 0.1 to 10 mol % of a crosslinking monomer (hereinafter referred to as "Component (iv)"); into contact with a straight-chain alcohol having from 4 to 10 carbon (hereinafter referred to as "the alcohol") atoms to effect esterification treatment and/or transesterification treatment.

Here, specific examples of Component (i) may include the unsaturated carboxylic acids, unsaturated carboxylic acid anhydride, unsaturated carboxylic acid alkyl esters having a branched or cyclic alkyl group which may have a substituent, and unsaturated carboxylic acid fluoroalkyl esters having a branched or cyclic fluoroalkyl group which may have a substituent as exemplified for Component (c) described above; specific examples of Component (ii), the acrylic acid lower alkyl esters having a straight-chain alkyl group having 1 to 3 carbon atoms, acrylic acid lower fluoroalkyl esters having a straight-chain fluoroalkyl group containing 1 to 3 carbon atoms, and the acrylates represented by the general formula (I) shown above as exemplified for Component (a) described above; specific examples of Component (iii), the methacrylates represented by the general formula (II) shown above as exemplified for Component (b) described above; and specific examples of Component (iv), the crosslinking monomers as exemplified for Component (f) described above; respectively.

Incidentally, in the above, Component (i), preferably, comprises methacrylic acid or comprises both acrylic acid and at least one selected from the group consisting of a methacrylic alkyl ester having the branched or cyclic alkyl group which may have a substituent and a methacrylic alkyl ester having the branched or cyclic fluoroalkyl group which may have a substituent. Where Component (i) comprises methacrylic acid, it more preferably further comprises acrylic acide together.

Here, where Component (i) comprises methacrylic acid, the content of methacrylic acid in the monomer mixture is preferably from 7 to 40 mol %; and where Component (i) comprises acrylic acid, the content of acrylic acid in the monomer mixture is preferably from 20 to 90 mol %. Furhter, Component (i) comprises both methacrylic acid and acrylic acid, the total content thereof in the monomer mixture is preferably from 50 to 80 mol %.

In the above process (2), the above monomers and their proportion are appropriately selected, and the polymerization is carried out with the above proportion to obtain a rigid polymer usually having a glass transition temperature of about 50° C. or more. This rigid polymer is then subjected to esterification treatment and/or transesterification treatment, and thus can be converted to a copolymer having a glass transition temperature of 20° C. or less, preferably 0° C. or less.

The polymerization of the above monomers may be carried out according to conventional radical polymerization. Methods for such polymerization may include a method in which the polymerization is carried out at temperatures of about 30° to 120° C. by stepwise raising the temperature in the presence of a peroxide or azo compound such as benzoyl peroxide and azobisisobutyronitrile as a heat polymerization initiator, and a method in which the polymerization is carried out at a temperature range usually of from 0° to 120° C., preferably from 10° to 100° C., under irradiation with ultraviolet ray in the presence of a photopolymerization initiator such as benzoin methyl ether, benzoin isopropyl ether, benzophenone and Michler's ketone. The heat polymerization initiator or the photopolymerization initiator may be used usually in an amount of from 0.01 to 1 part by weight based on 100 parts by weight of the whole monomers.

The bulk rigid polymer thus obtained is cut and polished into a desired shape to prepare a rigid lens substrate having the same shape as an intended soft contact lens.

The lens substrate having the shape of a contact lens, obtained in the above manner and comprising the rigid polymer, is brought into contact with the alcohol to be softened by esterification treatment and/or transesterification treatment to obtain the intended soft contact lens.

The esterification treatment and/or transesterification treatment of the rigid lens substrate can be carried out by bringing the into contact with the alcohol, preferably by dipping the rigid lens substrate in the alcohol. The straight-chain alcohol having 4 to 10 carbon atoms may include n-butanol, n-pentanol, n-hexanol, n-heptanol, n-octanol, n-nonanol and n-decanol.

The above esterification treatment and/or transesterification treatment may preferably be carried out in the presence of a catalyst, and usable as such a catalyst are usually available esterification catalysts as exemplified by concentrated sulfuric acid and methane sulfonic acid. The concentration of the catalyst in the alcohol may desirably be 0.2 to 10% by weight. The treatment can be sufficiently carried out under the conditions of a temperature of usually from about 20° to 200° C. and a reaction time of about 1 hour to 100 hours.

By bringing the rigid polymer into contact with the alcohol, the monomer units therein derived from the above Components (i) and (ii) are esterified and/or transesterified.

Here, the monomer unit derived from the unsaturated carboxylic acid among Component (i) is esterified by the alkyl group possessed by the alcohol, with a preferred esterification degree of from 70 to 95%.

Also, the branched or cyclic alkyl group or branched or cyclic fluoroalkyl group originating from, for instance, the acrylate of Component (i), the straight-chain alkyl group having 1 to 3 carbon atoms and straight-chain fluoroalkyl group having 1 to 3 carbon atoms originating from the acrylate of Component (ii) and $R_1$ group originating from the acrylate represented by Formula (I) are transesterified with the alkyl group possessed by the alcohol, with the transesterification degree usually of from 60 to 95%, preferably from 70 to 90%.

The above esterification treatment and/or transesterification treatment can soften the rigid copolymer.

Incidentally, bringing the lens substrate in the shape of a contact lens comprising the rigid copolymer into contact with the alcohol, or alternatively adding a hydrocarbon such as toluene to the alcohol to be used for said esterification treatment and/or transesterification treatment, may make it difficult for the soft contact lens to be damaged during the esterification treatment and/or transesterification treatment.

The soft contact lens obtained from the esterification treatment and/or the transesterification treatment, which has converted the rigid lens substrate into the soft contact lens, may contain catalysts used for the reactions, unreacted alcohols, solvents, lower alcohols or water resulting from the reactions, etc. Therefore, the soft contact is preferably washed by use of a Soxhlet extractor or the like. Solvents used for washing like this include ones having a boiling temperature of 150° C. or less among solvents, for example, hydrocarbons such as toluene, halogenated hydrocarbons such as dichloromethane and chloroform, ketones such as acetone, methyl ethyl ketone and 2-pentanone.

Where the Soxhlet extractor is used, washing may be carried out under reflux at the boiling temperature of the solvent employed for from 1 to 100 hours, preferably from 2 to 48 hours.

The soft contact lens after the washing can be used satisfactorily after being dried a temperature of from 20° to 150° C. But, it may be additionally washed with water, if necessary.

This invention will now be described below in greater detail by giving Examples, but this invention is by no means limited by these.

EXAMPLES

Example 1

To a mixture containing 67 mol % of acrylic acid, 10 mol % of methacrylic acid, 20 mol % of 2,2,3,4,4,4-hexafluorobutyl methacrylate, and, 3 mol % of ethylene glycol dimethacrylate as a crosslinking monomer, benzoin methyl ether as a photopolymerization initiator was added in an amount of 0.02 part by weight per 100 parts by weight of the above monomer mixture. Thereafter, 1.5 cc of the resulting mixture was poured into a mold of polyethylene, followed by irradiation with ultraviolet ray in an atmosphere of nitrogen for 8 hours at room temperature to carry out polymerization.

After polymerization, the resulting bulk polymer was cut and polished to prepare a rigid lens substrate having the shape of a contact lens. This rigid lens substrate was dipped in n-hexyl alcohol, to which 0.5% by weight of methanesulfonic acid was added to carry out reaction for 48 hours at the reflux temperature to esterify the acrylic acid and methacrylic acid in the copolymer. After the esterification, the copolymer was washed with n-hexyl alcohol by means of a Soxhlet extractor, followed by drying to obtain a non-hydrous soft contact lens.

Degrees of the esterification by n-hexyl alcohol, of the acrylic acid and methacrylic acid in the copolymer according to the above esterification were determined from the weight change before and after the esterification treatment to find to be about 90% and about 75%, respectively.

Accordingly, the composition of the copolymer having been subjected to the esterification treatment was identified to comprise 6.7 mol % of acrylic acid, 2.5 mol % of methacrylic acid, 60.3 mol % of hexyl acrylate, 7.5 mol % of hexyl methacrylate, 20 mol % of 2,2,3,4,4,4-hexafluorobutyl methacrylate, and 3 mol % of ethylene glycol dimethacrylate.

Subsequently, the soft contact lens obtained was subjected to all the tests described below. In the tests, a test specimen with a thickness of 0.2 mm and a diameter of 15 mm composed of the copolymer prepared in the same manner as above was used for the test for oxygen permeability coefficient; a test specimen with a thickness of 0.5 mm and a diameter of 15 mm composed of the copolymer prepared in the same manner as above for the test for presence or absence of deformation.

(1) Oxygen permeability coefficient was measured using a SEIKAKEN's film oxygen permeability measuring apparatus available from Rika Seiki Kogyo Co., Ltd., at 35° C. in a 0.9% physiological saline.

(2) Visible light transmission was measured using a double beam spectrometer of Type 200-20 available from Hitachi Ltd. for the soft contact lens before wearing and that after wearing for a week.

(3) Presence of deformation was examined using a radius scope of Type CG-D available from NEITZ Co.

(4) Among properties relating to mechanical strength, tensile strength and breaking extension was measured using an autograph IS-2000 available from Shimadzu Corp.

Folding endurance was determined by folding a test specimen double, applying a load to the folded test specimen and measuring the load which made a cruck generate in the test specimen.

Results obtained are shown in Table 1.

Comparative Example 1

To a mixture containing 77 mol % of acrylic acid, 20 mol % of 2,2,3,4,4,4-hexafluorobutyl methacrylate and 3 mol % of ethylene glycol dimethacrylate, benzoin methyl ether as a photopolymerization initiator was added in an amount of 0.02 part by weight per 100 parts by weight of the above monomer mixture. Thereafter, the resulting mixture was polymerized in the same manner as in Example 1.

After polymerization, the resulting bulk copolymer was cut and polished to prepare a rigid lens substrate having the shape of a contact lens. This rigid lens substrate was dipped in n-hexyl alcohol, to which 4% by weight of methanesulfonic acid was added to carry out reaction for 48 hours at the reflux temperature to esterify the acrylic acid and methacrylic acid in the copolymer. After the esterification, the copolymer was washed with n-hexyl alcohol, followed by drying to obtain a soft contact lens.

Degree of the esterification by n-hexyl alcohol, of the acrylic acid in the copolymer according to the above esterification treatment was determined in the same manner as in Example 1 to find to be about 99%.

Accordingly, the composition of the copolymer having been subjected to the esterification treatment was identified to comprise 0.8 mol % of acrylic acid, 76.2 mol % of hexyl acrylate, 20 mol % of 2,2,3,4,4,4-hexafluorobutyl methacrylate and 3 mol % of ethylene glycol dimethacrylate.

The oxygen permeability coefficient, visible light transmission, presence of deformation and mechanical strength were measured on this soft contact lens in the same manner as in Example 1.

Results obtained are shown in Table 1.

Comparative Example 2

To a mixture containing 20 mol % of 2,2,3,3,4,4,4-heptafluorobutyl methacrylate, 78 mol % of hexyl acrylate and 2 mol % of ethylene glycol dimethacrylate, azobisisobutyronitrile as a polymerization initiator was added in an amount of 0.2 part by weight per 100 parts by weight of the above monomer mixture. Thereafter, the resulting mixture was poured into a mold having the shape of a contact lens in an atmosphere of nitrogen, and stepwise polymerized for 10 hours in circulating water at 50° C. and further for 2 hours at 70° C. and for 4 hours at 100° C. The resulting soft contact lens was dried under reduced pressure for 20 hours at 100° C. to remove unreacted monomers.

The oxygen permeability coefficient, visible light transmission, presence of deformation and mechanical strength were measured on this soft contact lens in the same manner as in Example 1.

Results obtained are shown in Table 1.

Example 2

Using 25 mol % of methacrylic acid, 42 mol % of 2,2,2-trifluoroethyl acrylate, 30 mol % of 2,2,3,4,4,4-hexafluorobutyl methacrylate, and, 3 mol % of ethylene glycol dimethacrylate as a crosslinking monomer, polymerization, shaping and softening were carried out in the same manner as in Example 1 to obtain a soft contact lens.

Degree of the esterification by n-hexyl alcohol, of the acrylic acid and that of 2,2,2-trifluoroethyl acrylate in the copolymer according to the above esterification treatment and transesterification treatment were determined in the same manner as in Example 1 to find to be about 75% and about 85%, respectively.

The composition of the copolymer after the esterification treatment and transesterification is shown in Table 3.

The oxygen permeability coefficient, visible light transmission, presence of deformation and mechanical strength were measured on this non-hydrous soft contact lens in the same manner as in Example 1.

Results obtained are shown in Table 1.

Examples 3 to 8

Example 1 was repeated to effect the polymerization, shaping and esterification or transesterification to obtain soft contact lenses, except that the respective components subjected to copolymerization and the amounts thereof were changed as shown in Table 2.

Degrees of the esterification of the acrylic acid and methacrylic acid in the copolymer according to the above esterification and transesterification treatments, which were determined in the same manner as in Example 1, were found to be about 90% and about 75%, respectively, and degrees of the transesterification of the methyl acrylate and butyl acrylate were found to be about 87% and about 85%, respectively.

The composition of the copolymer after the esterification and transesterification treatments is shown in Table 3.

The oxygen permeability coefficient, visible light transmission, presence of deformation and mechanical strength were measured on these non-hydrous soft contact lenses in the same manner as in Example 1.

Results obtained are shown in Table 1.

TABLE 1

| | Oxygen permeability coefficient (cc(STP)·cm/cm²·sec·mmHg) (× 10⁻¹⁰) | Visible light transmission (%) Before wear | Visible light transmission (%) After wear | Presence of deformation | Tensile strength (g/mm²) | Breaking extension (%) | Folding endurance (kg) |
|---|---|---|---|---|---|---|---|
| Examples: | | | | | | | |
| 1 | 6.20 | 98 | 98 | None | 420 | 144 | 6.7 |
| 2 | 5.68 | " | " | " | 522 | 180 | 7.0 |
| 3 | 4.88 | " | " | " | 502 | 162 | 6.0 |
| 4 | 6.44 | " | " | " | 308 | 123 | 6.5 |
| 5 | 5.44 | " | " | " | 480 | 138 | 6.8 |
| 6 | 5.69 | " | " | " | 466 | 122 | 6.4 |
| 7 | 4.73 | " | " | " | 324 | 130 | 5.8 |
| 8 | 6.52 | " | " | " | 410 | 155 | 7.0 |
| Comparative Examples: | | | | | | | |
| 1 | 7.04 | " | " | " | 128 | 85 | 3.5 |
| 2 | 6.47 | " | " | " | 94 | 40 | 2.8 |

TABLE 2

| Component | (mol %) | Examples 3 | 4 | 5 | 6 | 7 | 8 |
|---|---|---|---|---|---|---|---|
| (i) | Acrylic acid | — | 52 | 62 | 77 | 62 | 47 |
| " | Methacrylic acid | 15 | 15 | 15 | — | — | 15 |
| " | 2,2,2-Trifluoro-1-trifluoromethylethyl methacrylate | — | — | — | 10 | — | — |
| " | t-Butyl methacrylate | — | — | — | — | 10 | — |
| (ii) | Methyl acrylate | 52 | — | — | — | — | — |
| " | n-Butyl acrylate | — | 15 | — | — | — | 10 |
| (iii) | FMA *1 | 30 | — | — | — | 25 | — |
| " | FMA *2 | — | — | 20 | — | — | 25 |
| " | FMA *3 | — | 15 | — | 10 | — | — |
| (iv) | Ethylene glycol dimethacrylate | 3 | 3 | 3 | 3 | 3 | 3 |
| Type of alcohol: *4 | | HXN | HXN | BTN | BTN | OCN | HXN |

*1: 2,2,3,4,4,4-hexafluorobutyl methacrylate
*2: 3,3,4,4,5,5,6,6,7,7,8,8-tridecafluorooctyl methacrylate
*3: 3,3,4,4,5,5,6,6,7,7,8,8,9,9,10,10,10-heptadecafluorodecyl methacrylate
*4: HXN n-Hexanol BTN: n-Butanol OCN: n-Octanol

TABLE 3

| Composition (mol %) | Examples 2 | 3 | 4 | 5 | 6 | 7 | 8 |
|---|---|---|---|---|---|---|---|
| Component (a) | | | | | | | |
| n-Hexyl acrylate | 35.7 | 45.2 | 59.5 | — | — | — | 50.8 |
| n-Butyl acrylate | — | — | 2.3 | 55.8 | 69.3 | — | 1.5 |
| n-Octyl acrylate | — | — | — | — | — | 55.8 | — |
| Component (b) | | | | | | | |
| FMA *1 | 30 | 30 | — | — | — | 25 | — |
| FMA *2 | — | — | — | 20 | — | — | 25 |
| FMA *3 | — | — | 15 | — | 10 | — | — |
| Component (c) | | | | | | | |
| Acrylic acid | — | — | 5.2 | 6.2 | 7.7 | 6.2 | 4.7 |
| Methacrylic acid | 6.3 | 3.7 | 3.7 | 3.7 | — | — | 3.7 |
| 2,2,2-Trifluoro-1-trifluoromethylethyl methacrylate | 6.3 | — | — | — | 10 | — | — |
| t-Butyl methacrylate | — | — | — | — | — | 10 | — |
| Component (d) | | | | | | | |
| 2,2,2-Trifluoroethyl acrylate | — | — | — | — | — | — | — |
| Methyl acrylate | — | 6.8 | — | — | — | — | — |
| Component (e) | | | | | | | |
| n-Hexyl methacrylate | 18.7 | 11.3 | 11.3 | — | — | — | 11.3 |
| n-Butyl methacrylate | — | — | — | 11.3 | — | — | — |
| Component (f) | | | | | | | |
| Ethylene glycol dimethacrylate | 3 | 3 | 3 | 3 | 3 | 3 | 3 |

*1-3 same as noted for Table 2

Test Example

The soft contact lens obtained in Example 1 was continuously worn for a month on the right eye of each of five rabbits. As a result, there was observed no ceratonosus on the surface of cornea, and also observed no neogenetic blood vessel or corneal edema from a histological view.

What is claimed is:

1. A non-hydrous soft contact lens comprising a copolymer comprising, as monomer units,:
   (a) from 33.9 to 89 mol % of an acrylate represented by the general formula (I) shown below;
   (b) from 4.9 to 65 mol % of a methacrylate represented by the general formula (II) shown below;
   (c) from 1 to 20 mol % of at least one monomer selected from the group consisting of an unsaturated carboxylic acid, an unsaturated carboxylic acid anhydride an unsaturated carboxylic acid alkyl ester having a branched or cyclic alkyl group which may have a substituent, and an unsaturated carboxylic acid fluoroalkyl ester having a branched or cyclic fluoroalkyl group which may have a substituent;

(d) from 0 to 20 mol % of at least one monomer selected from the group consisting of an acrylic acid lower alkyl ester having a straight-chain alkyl group containing 1 to 3 carbon atoms, and an acrylic acid lower fluoroalkyl ester having a straight-chain fluoroalkyl group containing 1 to 3 carbon atoms;

(e) from 0 to 20 mol % of a methacrylic acid alkyl ester having a straight-chain alkyl group containing 4 to 10 carbon atoms; and (f) from 0.1 to 10 mol % of a crosslinking monomer.

General formula (I):

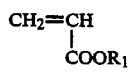

wherein $R_1$ is at least one selected from the group consisting of a straight-chain fluoroalkyl group represented by the formula: $(CH_2)_l-C_mF_nH_p$, where l is an integer of 1 or 2, m is an integer of 3 to 8, n is an integer of 6 or more, p is an integer of 0 or more, and m, n and p have the relation of $n+p=2m+1$; and a straight-chain alkyl group represented by the formula: $C_qH_{2q+1}$, where q is an integer of 4 to 10.

General formula (II):

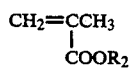

wherein $R_2$ is a straight-chain fluoroalkyl group represented by the formula: $(CH_2)_2-C_xF_yH_z$, where w is an integer of 1 or 2, x is an integer of 1 to 10, y is an integer of 3 or more, z is an integer of 0 or more, and x, y and z have the relation of $y+z=2x+1$.

2. The non-hydrous soft contact lens according to claim 1, wherein said Component (c) comprises methacrylic acid.

3. The non-hydrous soft contact lens according to claim 2, wherein the content of said methacrylic acid is from 2 to 10 mol %.

4. The non-hydrous soft contact lens according to claim 1, wherein said Component (c) comprises methacrylic acid and acrylic acid.

5. The non-hydrous soft contact lens according to claim 4, wherein the total content of said methacrylic acid and acrylic acid is from 2 to 10 mol %.

6. The non-hydrous soft contact lens according to claim 4, wherein said Component (c) consists of methacrylic acid and acrylic acid.

7. The non-hydrous soft contact lens according to claim 1, wherein said Component (c) comprises acrylic acid and at least one monomer selected from the group consisting of methacrylic acid alkyl ester having a branched or cyclic alkyl group which may have a substituent and a methacrylic acid fluoroalkyl ester having a branched or cyclic fluoroalkyl group which may have a substituent.

8. The non-hydrous soft contact lens according to claim 7, wherein the content of acrylic acid is from 2 to 10 mol %.

9. The non-hydrous soft contact lens according to claim 7, wherein Component (c) comprises acrylic acid and at least one monomer selected from the group consisting of t-butyl methacrylate, cyclohexyl methacrylate, benzyl methacrylate, 2,2,2-trifluoro-1-trifluoromethylethyl methacrylate and 2,2,3,4,4,4-hexafluoro-t-hexyl methacrylate.

10. The non-hydrous soft contact lens according to claim 1, wherein said Component (a) is at least one selected from the group consisting of 2,2,3,3,4,4,4-heptafluorobutyl acrylate, 2,2,3,4,4,4-hexafluorobutyl acrylate, 3,3,4,4,5,5,6,6,7,7,8,8-tridecafluorooctyl acrylate, 3,3,4,4,5,5,6,6,7,7,8,8,9,9,10,10-heptadecafluorodecyl acrylate, n-butyl acrylate, n-hexyl acrylate, and n-octyl acrylate.

11. The non-hydrous soft contact lens according to claim 1, wherein said Component (b) is at least one selected from the group consisting of 2,2,3,4,4,4-hexafluorobutyl methacrylate, 2,2,3,3,4,4,4-heptafluorobutyl methacrylate, 3,3,4,4,5,5,6,6,7,7,8,8-dodecafluorooctyl methacrylate, 3,3,4,4,5,5,6,6,7,7,8,8-tridecafluorooctyl methacrylate and 3,3,4,4,5,5,6,6,7,7,8,8,9,9,10,10-heptadecafluorodecyl methacrylate.

12. The non-hydrous soft contact lens according to claim 1, wherein said Component (c) is at least one selected from the group consisting of methyl acrylate, ethyl acrylate, n-propyl acrylate, 2,2,2-trifluoroethyl acrylate, 2,2,3,3-tetrafluoropropyl acrylate, and 2,2,3,3,3-pentafluoropropyl acrylate.

13. The non-hydrous soft contact lens according to claim 1, wherein said Component (e) is selected from the group consisting of n-butyl methacrylate, n-pentyl methacrylate and n-hexyl methacrylate.

14. The non-hydrous soft contact lens according to claim 1, wherein said Component (c) is the dimethacrylate of an diol selected from the group consisting of ethylene glycol, diethylene glycol, 1,3-butanediol, 1,4-butanediol and 1,6-hexanediol.

15. The non-hydrous soft contact lens according to claim 1 which contains from 5 to 50% by weight of fluorine.

16. The non-hydrous soft contact lens according to claim 1 which has an glass transition temperature of not higher than 20° C.

* * * * *